US008873372B2

(12) United States Patent
Gan et al.

(10) Patent No.: US 8,873,372 B2
(45) Date of Patent: *Oct. 28, 2014

(54) METHOD AND APPARATUS FOR FAST REROUTE IN A CONNECTION-ORIENTED NETWORK

(71) Applicant: Juniper Networks, Inc., Sunnyvale, CA (US)

(72) Inventors: Der-Hwa Gan, Fremont, CA (US); Anthony Joseph Li, San Mateo, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/959,068

(22) Filed: Aug. 5, 2013

(65) Prior Publication Data

US 2013/0315056 A1    Nov. 28, 2013

Related U.S. Application Data

(63) Continuation of application No. 12/908,902, filed on Oct. 21, 2010, now Pat. No. 8,526,298, which is a continuation of application No. 12/254,906, filed on Oct. 21, 2008, now Pat. No. 7,843,808, which is a continuation of application No. 09/354,640, filed on Jul. 15, 1999, now Pat. No. 7,457,233.

(51) Int. Cl.
| | |
|---|---|
| G06F 11/00 | (2006.01) |
| H04L 12/26 | (2006.01) |
| H04J 1/16 | (2006.01) |
| H04Q 11/04 | (2006.01) |
| H04L 12/24 | (2006.01) |
| H04Q 3/66 | (2006.01) |
| H04L 12/70 | (2013.01) |

(52) U.S. Cl.
CPC ........ *H04L 41/0654* (2013.01); *H04Q 11/0478* (2013.01); *H04Q 2213/13164* (2013.01); *H04L 2012/562* (2013.01); *H04Q 2213/13332* (2013.01); *H04Q 2213/13176* (2013.01); *H04Q 2213/13056* (2013.01); *H04L 2012/5627* (2013.01); *H04Q 2213/13167* (2013.01); *H04Q 3/66* (2013.01); *H04Q 2213/13103* (2013.01); *H04Q 2213/13141* (2013.01); *H04Q 2213/13217* (2013.01); *H04Q 2213/13146* (2013.01)
USPC ........... 370/216; 370/217; 370/218; 370/219; 370/220; 370/221

(58) Field of Classification Search
CPC ... H04Q 3/66; H04Q 11/0478; H04L 41/0654
USPC ......... 370/216–221, 222, 225, 226–228, 242, 370/389, 351, 395.32, 237, 238, 255, 370/395.31; 709/227, 229, 245, 241; 714/1, 714/4
See application file for complete search history.

(56) References Cited

U.S. PATENT DOCUMENTS

| | | |
|---|---|---|
| 5,058,105 A | 10/1991 | Mansour et al. |
| 5,065,399 A | 11/1991 | Hasegawa et al. |

(Continued)

OTHER PUBLICATIONS

Semeria, "Traffic Engineering for the New Public Network," Jan. 25, 1999, downloaded from www.juniper.net/leadingedge/whitepapars, 19 pgs.

(Continued)

*Primary Examiner* — Chuong T Ho
(74) *Attorney, Agent, or Firm* — Harrity & Harrity, LLP (57) ABSTRACT

A method and an apparatus for rapidly resuming, at times of failures, network traffic in a connection-oriented network by using an alternative route pre-computed and stored locally in nodes along an initial route without requiring signaling of upstream nodes or a master server.

20 Claims, 7 Drawing Sheets

(56) References Cited

U.S. PATENT DOCUMENTS

| | | | |
|---|---|---|---|
| 5,115,495 | A | 5/1992 | Tsuchiya et al. |
| 5,539,815 | A | 7/1996 | Samba |
| 5,546,542 | A | 8/1996 | Cosares et al. |
| 5,748,611 | A | 5/1998 | Allen et al. |
| 5,856,981 | A | 1/1999 | Voelker |
| 5,872,773 | A | 2/1999 | Katzela et al. |
| 5,999,286 | A | 12/1999 | Venkatesan |
| 6,021,113 | A | 2/2000 | Doshi et al. |
| 6,034,946 | A | 3/2000 | Roginsky et al. |
| 6,041,057 | A | 3/2000 | Stone |
| 6,047,331 | A | 4/2000 | Medard et al. |
| 6,122,283 | A | 9/2000 | Lee |
| 6,122,753 | A | 9/2000 | Masuo et al. |
| 6,141,319 | A | 10/2000 | Dighe et al. |
| 6,163,525 | A | 12/2000 | Bentall et al. |
| 6,167,025 | A | 12/2000 | Hsing et al. |
| 6,215,765 | B1 | 4/2001 | McAllister et al. |
| 6,252,853 | B1 | 6/2001 | Ohno |
| 6,282,170 | B1 | 8/2001 | Bentall et al. |
| 6,336,129 | B1 | 1/2002 | Ise et al. |
| 6,359,857 | B1 | 3/2002 | Ahmad et al. |
| 6,366,556 | B1 | 4/2002 | Ballintine et al. |
| 6,430,150 | B1 | 8/2002 | Azuma et al. |
| 6,466,985 | B1 | 10/2002 | Goyal et al. |
| 6,496,479 | B1 | 12/2002 | Shionozaki |
| 6,538,416 | B1 | 3/2003 | Hahne et al. |
| 6,560,218 | B2 | 5/2003 | McAllister et al. |
| 6,600,724 | B1 | 7/2003 | Cheng |
| H0002075 | H | 8/2003 | Gnauck et al. |
| 6,606,297 | B1 | 8/2003 | Magill et al. |
| 6,633,544 | B1 | 10/2003 | Rexford et al. |
| 6,697,329 | B1 | 2/2004 | McAllister et al. |
| 6,717,920 | B1 | 4/2004 | Cheng |
| 6,775,266 | B1 | 8/2004 | Furtenback et al. |
| 6,775,295 | B1 | 8/2004 | Lothberg et al. |
| 6,785,277 | B1 | 8/2004 | Sundling et al. |
| 6,813,242 | B1 | 11/2004 | Haskin et al. |
| 6,856,627 | B2 | 2/2005 | Saleh et al. |
| 6,857,026 | B1 | 2/2005 | Cain |
| 6,992,978 | B1 * | 1/2006 | Humblet et al. ............ 370/228 |
| 7,002,917 | B1 | 2/2006 | Saleh |
| 7,058,845 | B2 * | 6/2006 | Fujita ............................ 714/4.2 |
| 7,061,896 | B2 | 6/2006 | Jabbari et al. |
| 7,075,889 | B2 | 7/2006 | Shiozawa |
| 7,093,027 | B1 | 8/2006 | Shabtay et al. |
| 7,126,907 | B2 | 10/2006 | Carpini et al. |
| 7,257,731 | B2 | 8/2007 | Hunt et al. |
| 7,298,693 | B1 | 11/2007 | Owens et al. |
| 7,315,510 | B1 | 1/2008 | Owens et al. |
| 7,343,423 | B2 | 3/2008 | Goguen et al. |
| 7,370,119 | B2 | 5/2008 | Provine et al. |
| 7,373,401 | B1 | 5/2008 | Azad |
| 7,380,017 | B2 | 5/2008 | Weil et al. |
| 7,457,233 | B1 | 11/2008 | Gan et al. |
| 7,843,808 | B2 | 11/2010 | Gan et al. |
| 2003/0053463 | A1 | 3/2003 | Vikberg et al. |
| 2011/0090784 | A1 | 4/2011 | Gan et al. |

OTHER PUBLICATIONS

Callon et al., Network Working Group Internet draft, "A Framework for Multiprotocol Label Switching," Nov. 21, 1997, 65 pgs.

Rosen et al. Network Working Group Internet draft, "MPLS Label Stack Encoding," Sep. 1998 21 pgs.

Awduche et al., Network Working Group Internet draft, "Requirements for Traffic Engineering Over MPLS," Oct. 1998, 27 pgs.

Awduche et al., Network Working Group Internet draft, "Extentions to RSVP for LSP Tunnels," Feb. 1999, 58 pgs.

Smit et al., Network Working Group Internet draft, "IS-IS extentions for Traffic Engineering," Feb. 1999, 7 pgs.

Sonet 101, product information, Nortel, 67 pgs.

Nortel, "Introduction to Sonet Networking," product and service information, Oct. 1996, 38 pgs.

Gersht et al. "Architecture for Restorable Call Allocation and Fast VP Restoration in Mesh ATM Networks," IEEE International Conference on Communications (Jun. 8, 1997) (pp. 1158-1163).

Wipusitwarakun et al. "VP's Priority Based Restoring Function Enhanced Self-heating Algorithm," IEICE Transactions on Communications, JP, Institute of Electronics Information and Comm. Eng., Tokyo, vol. E81-B, No. 11 (Nov. 1, 1998) (pp. 2100-2108).

Hagard et al. "Multiprotocol Label Switching in ATM Networks," Ericsson Review, SE, Ericsson, Stockholm, No. 1, 1998, p. 32-39.

* cited by examiner

METHOD AND APPARATUS FOR FAST REROUTE IN A CONNECTION-ORIENTED NETWORK

RELATED APPLICATIONS

This application is a continuation of U.S. patent application Ser. No. 12/908,902, filed Oct. 21, 2010, which is continuation of U.S. patent application Ser. No. 12/254,906, filed Oct. 21, 2008 (now U.S. Pat. No. 7,843,808), which is a continuation of U.S. patent application Ser. No. 09/354,640, filed Jul. 15, 1999 (now U.S. Pat. No. 7,457,233). The disclosures of these applications are incorporated herein by reference.

BACKGROUND OF THE INVENTION

This invention relates to a connection-oriented network, and more specifically to a method and an apparatus for resuming traffic rapidly after a failure in a network element.

Routing traffic using shortest path algorithms (e.g., Interior Gateway Protocol (IGP) such as implemented by Open Shortest Path First (OSPF) or Intermediate System to Intermediate System (IS-IS)) contributes significantly to congestion problems in a network. Because IGP is topology-driven, bandwidth availability and traffic characteristics are not considered when making routing decisions. An overlay model, such as using EP-over-ATM or IP-over-Frame-Relay, provides a virtual topology on top of the physical topology and can alleviate traffic congestion. The overlay model supports constraint-based routing to configure and maintain a virtual topology.

In a connection-oriented network, such as X.25, Frame Relay, or ATM networks, packets are routed based on a virtual topology consisting of virtual circuits (routes). At the beginning of a transmission, a connection is established and every packet belonging to a given connection is transmitted through the same established route. In practice, a communications protocol, such as RSVP, signals a router to reserve bandwidth for real-time transmission.

In conventional connection-oriented networks, such as IP-over-ATM, each node communicates with every other node by a set of permanent virtual circuits (PVC) that are configured across the ATM physical topology. In the conventional model, the nodes only have knowledge of the individual PVCs that appear to them as simple point-to-point circuits between two nodes. Furthermore, the physical paths for the PVC overlay are typically calculated by an offline configuration utility on an as-needed basis, such as when congestion occurs, or a new link is added, etc. The PVC paths and attributes are globally optimized by an offline configuration utility based on link capacity and historical traffic patterns. The offline configuration utility can also calculate a set of secondary PVCs that is ready to respond to failure conditions.

The connection-oriented network has an advantage over other types of network models in that it does not require complete address information for every packet after the connection has been established. Instead, only a short connection identifier is included with each packet to define the virtual circuit to which the packet belongs. For example, in a Multi-protocol Label Switching (MPLS) framework, a label is attached to a packet as it enters the network. Forwarding decisions are based on the attached label without consulting the original packet headers.

Internet Protocol traffic is widely carried over the Synchronous Optical Network (SONET) lines, either using ATM as a management layer or over SONET directly. In such a network, failure of a network element will cause a loss of service until a new connection can be established.

SONET uses a self-healing ring architecture capable of rerouting traffic if a line goes down. The restoration time is on the order of 50 milliseconds. For service providers who need to provide voice over IP and other high reliability services, a fast reroute time compatible with the SONET restoration time of 50 milliseconds is required.

There are generally two conventional approaches to providing fast reroute, both requiring the use of signaling protocols. One approach is to signal the failure back to an ingress node where the packet enters the network. The ingress node recomputes and establishes an alternative virtual circuit as soon as possible. However, given that the signaling time required to propagate a signal for a round-trip across the continental United States is about 75 milliseconds, this approach is too slow to be compatible with SONET's restoration time of 50 milliseconds.

In a second conventional approach, a master server monitors the network and pre-establishes alternative virtual circuits. The master server is notified of a failure and directs traffic to an alternative virtual circuit. However, the signaling between the master server and the failed elements still causes delay. Furthermore, if the failed node or link carries multiple virtual circuits, multiple signaling can create a peak in both the processing requirements and the bandwidth utilization.

SUMMARY OF THE INVENTION

This invention offers dynamic rerouting in a network based on pre-calculated alternative routes.

Unlike the conventional system in which one node, whether a master server or an ingress node, establishes an alternative route after a failure is detected, one or more nodes along an established route pre-compute alternative routes from the node to the destination device.

The invention provides a method and an apparatus for a network to continue operating at times of failure without requiring signaling back to an ingress node or a master server.

In one aspect, the invention is directed to a network for forwarding packets from a source device to a destination device. The network has a plurality of network elements including nodes and connecting links, a master server for monitoring the network and establishing an initial route between the source device and the destination device. One or more of the nodes along the initial route have a processor to compute an alternative route for the initial route, a storage space to store the initial route and the alternative route, a mechanism to detect failure in a downstream network element in the initial route, and a forwarder to automatically forward a packet to the next node.

Aspects of the invention can include one or more of the following features. The network can be connection-oriented with a plurality of established initial routes. The nodes can be label-switched routers supporting Multiprotocol Label Switching (MPLS). The processors at one or more of the nodes along the initial route can pre-compute an alternative route not including a failed downstream node and link on the initial route. The alternative route can also not include a plurality of nodes that are identified as likely to fail with the downstream node and link according to network configuration data.

The mechanism to detect failure can send communication packets to downstream nodes at regular intervals. The forwarder can forward packets by swapping a label on a packet with another value before forwarding the packet to the next node.

In another aspect, the invention is directed to a method of forwarding packets from a source device to a destination device. The method includes determining an initial route, determining an alternative route, forwarding packets on the initial route, detecting a failed element, and automatically forwarding packets on the alternative route without communicating with either the upstream nodes or the master server.

Aspects of the invention can include one or more of the following features. The method of determining the initial route can begin with a shortest path algorithm. The shortest path can be refined according to administrative constraints, and is established as the initial route. The administrative constraints can include bandwidth allocation and hop limit. The initial route can be prioritized to establish a hierarchy for preemption in routing network traffic. Determining the alternative route can comprise determining a shortest route from a node preceding the failed element to the destination device within the network, excluding the failed element on the initial route, and establishing the alternative route for forwarding packets. Failures within the system can be detected locally by a node preceding the failed element without requiring notification of a master server or an ingress node.

The method can further include computing the alternative route, reserving bandwidth available on the initial route, generating the alternative route by invoking a routing protocol, refining the alternative route by excluding the failed element, and establishing the alternative route.

The bandwidth allocation can include dynamic balancing of capacity of nodes and links. The method determining the alternative route can include reserving bandwidth available on the initial route, identifying a plurality of nodes associated with the failed node according to network configuration information, generating the alternative route excluding the failed node and the plurality of nodes, and establishing the alternative route.

In another aspect, the invention is also directed to a method for rerouting, locally, packets traveling on an established route when a node in a network of interconnected nodes fails. The method includes computing, at a plurality of intermediary nodes along the initial route, an alternative route leading from the computing node to the destination device of the established route, determining locally that the established route has failed, and automatically forwarding packets according on the alternative route.

Aspects of the invention can include one or more of the following features. The method of computing the alternative route can include reserving bandwidth available on the initial route, identifying a plurality of nodes associated with the failed node according to network configuration information, generating the alternative route excluding the failed node and the plurality of nodes, and establishing the alternative route. For network efficiency, the system can merge a set of established routes with the same destination device and same administrative constraints as the initial route, identify a common node after which the set of established routes and the initial route utilize the same network elements, and establish a new merged route from the common node to the destination device.

In another aspect, the invention is also directed to an apparatus and a method for rapidly resuming, at times of failures, network traffic in a connection-oriented network by using an alternative route pre-computed and stored locally in nodes along an initial route without requiring signaling of upstream nodes or a master server.

Implementations of this invention offer many advantages, including minimizing the time delay in routing network traffic after failure in a network element. Currently network traffic is normally put on hold until notification of failure is delivered to the a master server or an ingress node. This notification requirement causes additional time delay, and also raises concerns regarding reliability of notification delivery. This invention removes both obstacles by pre-computing and storing an alternative route locally for rapid resumption of traffic at times of failure.

A fully implemented version of this invention will also enhance the reliability of transmission and reduce the probability of packet loss in a network. These and other advantages and features will be apparent from the following description and claims.

BRIEF DESCRIPTION OF THE DRAWING

FIG. 3b is a flow diagram for steps performed during the initialization step shown in FIG. 3a.

FIG. 4 is a flow diagram detailing the steps for computing an initial route.

DETAILED DESCRIPTION

The following detailed description provides specific details of the present invention. However, those skilled in the art will appreciate that the present invention may be practiced without these specific details. Well known methods, procedures, components, protocols, and circuits are not described in detail as they are presumed to be within the knowledge of those skilled in the art.

The present invention is related to routing packets in a connection-oriented network having routers interconnected by links. For illustration purposes, the following detailed description refers to Multiprotocol Label Switching (MPLS) as the connection-oriented framework. Those skilled in the art will understand that MPLS is only one type of connection-oriented framework. Other types of connection-oriented sub-networks include, but are not limited to, X.25, Frame Relay, and POTS (Plain Old Telephone Service). The present invention may be applied to any type of connection-oriented sub-network using the structures and methods described herein and is not limited to the MPLS framework.

Figure 1A:
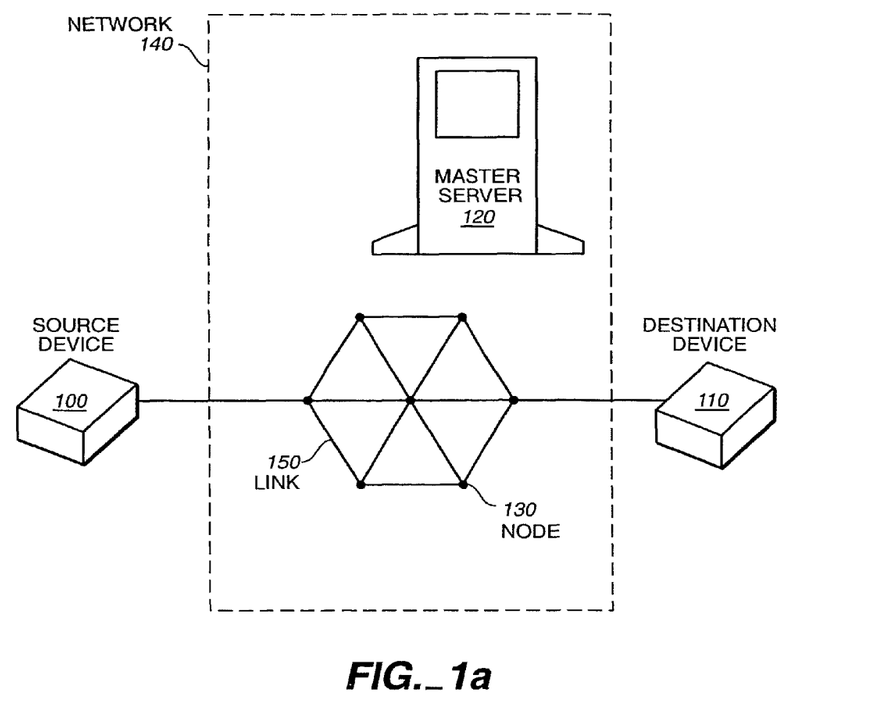
FIG. 1a is a schematic diagram of a connection-oriented network supporting fast reroute.

FIG. 1a refers to a network 140 for routing traffic from source device 100 to destination device 110. Network 140 is composed of a set of interconnected nodes, such as node 130. Nodes are connected to other nodes through links, such as link 150. Each link, including link 150, has an associated bandwidth, the aggregate of which define an amount of traffic that can be carried in the network. In one implementation, network 140 is composed of routers (nodes), interconnected by leased lines (links), such as T1 or T3 links. Master server 120 monitors the status of network 140. Master server 120 calculates, using an off-line configuration utility, an initial route that will route IP packets from source device 100 to destination device 110 through network 140.

Figure 1B:
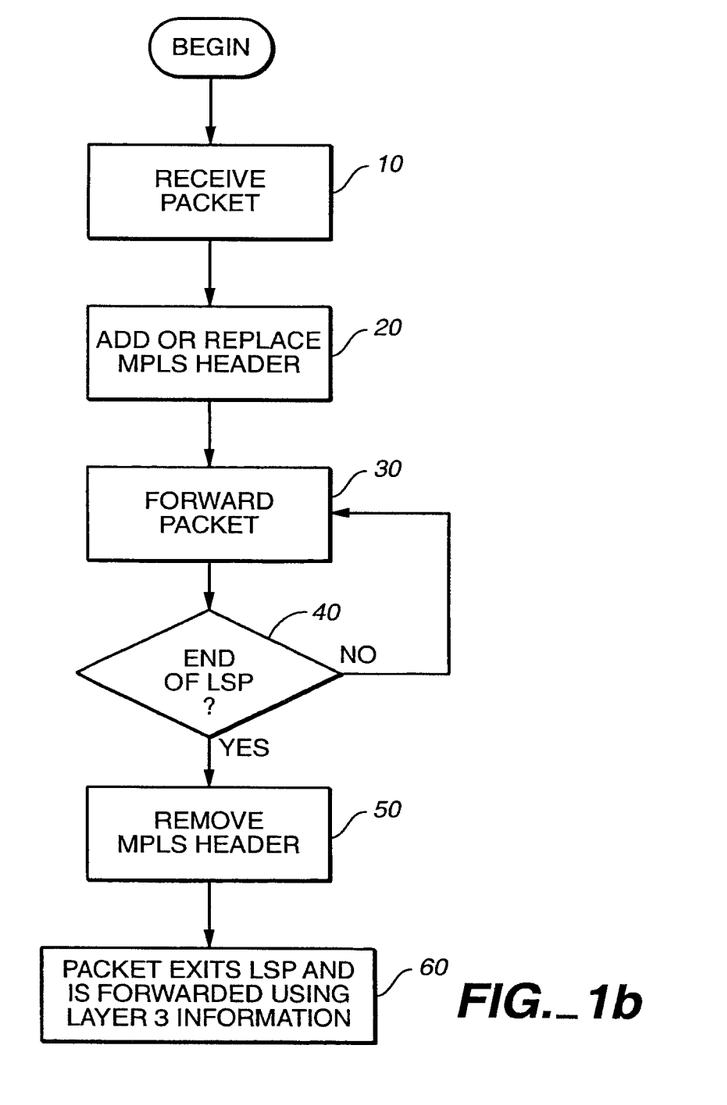
FIG. 1b is a flow diagram of MPLS routing along a LSP.

MPLS, as adopted in this invention, is responsible for directing flow of IP packets along a predetermined path across a network. A route, in the MPLS framework, is called a label-switched path (LSP), as opposed to a PVC in the IP-over-ATM model. As shown in FIG. 1b, when a node receives a packet (10), it adds a MPLS header to the packet or replaces the existing MPLS header by another MPLS header (20), and forwards the packet to the next node of the LSP (30). The MPLS header can be a 32-bit pattern with a value anywhere between 0 and 1 million. The labeled packet is forwarded along the LSP by the nodes until it reaches the end of the LSP (40), at which point the MPLS header is removed (50) and the packet exits the LSP and is forwarded based on Layer 3 information (60), such as the IP destination address in the original IP header. A router with such capabilities is called a label-switched router (LSR). Within the domain, MPLS forwarding decisions are made without consulting the original IP header.

Figure 2A:
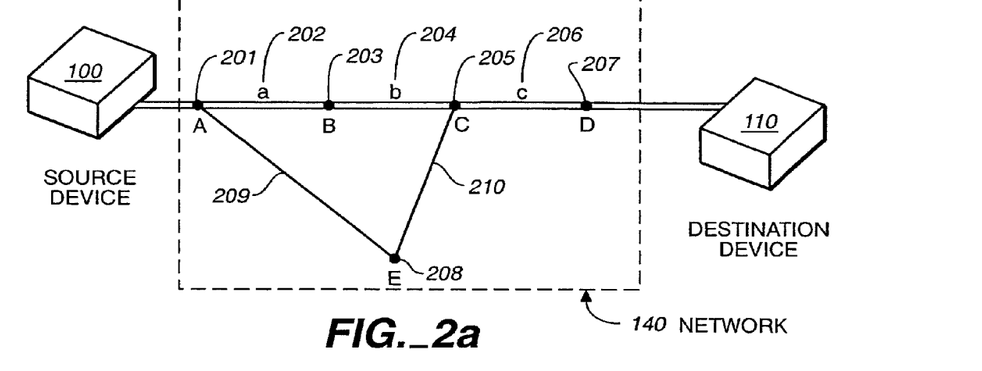
FIG. 2a is a schematic diagram of an initial route.
Figure 2B:
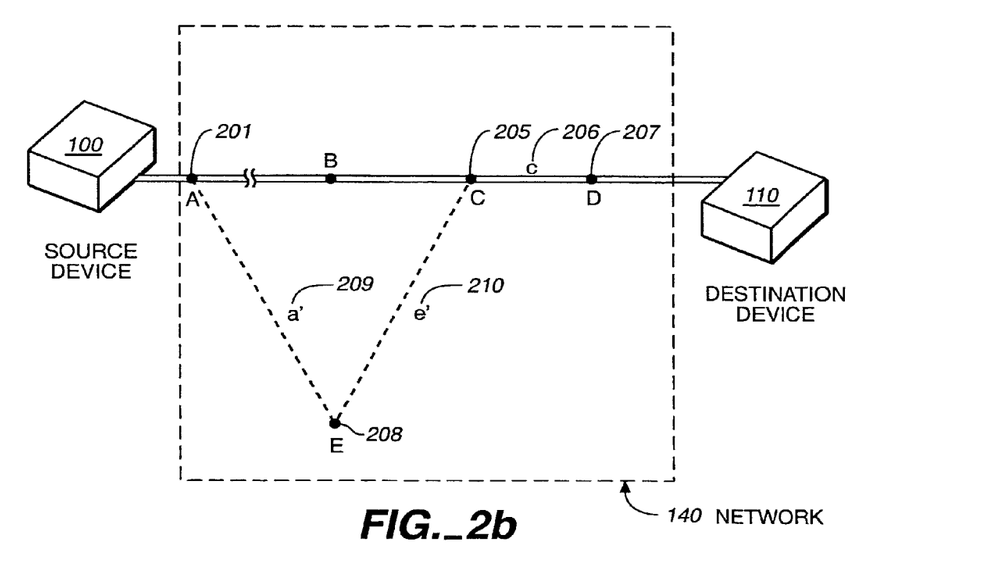
FIG. 2b is a schematic diagram of an alternative route for the initial route.

If no elements in a LSP fails, the packet is forwarded as described above. One or more nodes along an LSP can be "alternative-route-enabled," which means that alternative routes are pre-calculated and stored at these nodes along an initial route configured by master server 120. When a failure is detected, the most immediate alternative-route-enabled node upstream from the failed element adopts the alternative route to route traffic, thus avoiding the failed node and element. For example, in FIG. 2a, source device 100 is connected to destination device 110 through nodes 201, 203, 205 and 207, and links 202, 204 and 206 within network 140. The initial route is one of the possible paths through network 140 between source 100 and destination 110. Node 201 is alternative-route-enabled, and stores an alternative route leading from node 201 to destination device 110 in case the immediately downstream node, node 203, and the following link, link 202, fails. The alternative route, as shown in FIG. 2b, diverts traffic from link 202 and node 203 and forwards the packets to link 209, node 208, and link 210. The alternative route is shown in FIG. 2b by a dotted line, contrasting with the double solid lines representing the initial route in FIG. 2a.

Figure 3A:
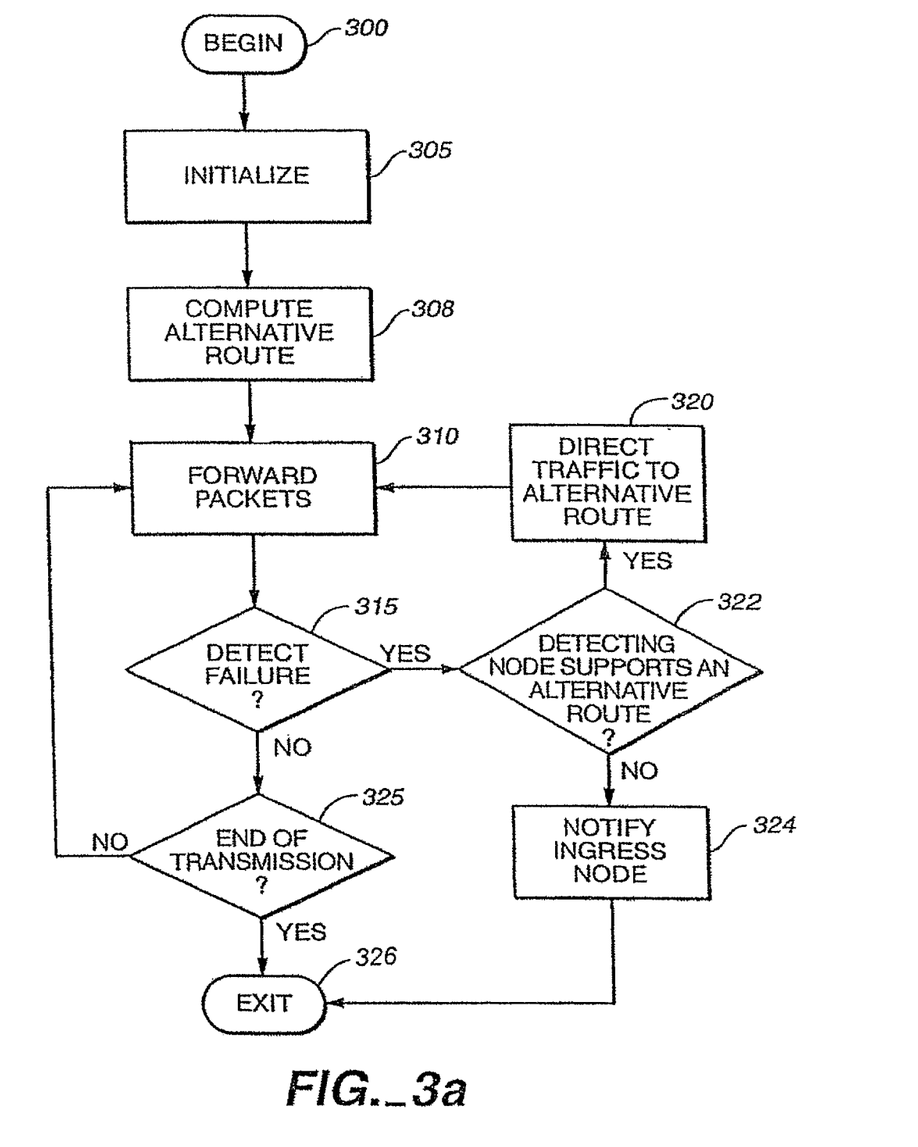
FIG. 3a is flow diagram demonstrating steps for implementing fast reroute in a connection-oriented network.

FIG. 3a gives an overview of one implementation of this invention, detailing steps for forwarding IP-packets from source device 100 to destination device 110. The process begins at step 300. As a preparatory step, initialization steps are performed at step 305, the details of which are discussed in conjunction with FIG. 3b. At initialization, the master server 120 generates an initial route for connecting the source device 100 to destination device 110 (330). A signaling protocol, such as Resource ReSerVation Protocol (RSVP), signals a router to reserve bandwidth for real-time transmission and to clear a path for traffic. RSVP messages are exchanged among all nodes along the initial route to set up the route and then to monitor the route for failures. These RSVP messages carry information describing the LSP and its attributes. This initial route (topology) is then stored at all nodes along the route in step 335. The structure of the stored information is discussed later in connection with FIG. 6b. The same signaling protocol, RSVP, that was used to set up an initial route, is also used to establish an alternative route, as indicated in step 340. Use of the same signaling protocol to establishing routes not only achieves implementation simplicity, it also allows better system efficiency by merging routes of identical administration constraints, as detailed in step 540. Once the initial alternative route is established, it can be used to forward packets upon failure of the initial route.

Referring back to FIG. 3a, after initialization, alternative routes leading from the alternative-route-enabled nodes are computed (308). The alternative routes are computed along the initial route computed in step 330 of FIG. 3b to the destination device 110. Information associated with the alternative route is stored locally at the alternative-route-enabled nodes so an alternative route is readily available for rapid resumption of network traffic when a failure occurs in the initial route. Packets are forwarded using the initial routes (310). According to the stored topology information, each node forwards packets to the IP address of the next node on the specified link. In a MPLS framework, each node swaps a label on the IP packet before sending it to the next hop. While in session, RSVP hello extensions are implemented at each node providing hello packets that can be sent directly to other nodes on the initial route. A failure can thus be quickly detected (by a failure to respond to a hello message). Once a failure is detected (315), and if the detecting node is alternative-route-enabled (322), traffic for the failed route is directed to the pre-computed alternative route stored locally (320). Thereafter, packets are forwarded using the alternative route. If the detecting node is not alternative-route-enabled, a message is sent to an ingress node (324), the first node in the system on the initial route. Thereafter, the process ends (330) and the ingress node may invoke a back-up mechanism. In another implementation, when the node detecting a failure is not alternative-route-enabled, a failure message can be forwarded upstream to a nearest in-line alternative-route-enabled node on the initial route. The alternative-route enabled node can implement the alternative route and continue forwarding packets.

If no failure is detected, packets are forwarded along the initial route or alternative route until the traffic ends at step 325 and the process finishes in step 330. Single or multiple failures in the system can be supported by directing traffic to alternative routes stored locally at alternative-route-enabled nodes.

Figures 3B, 4:
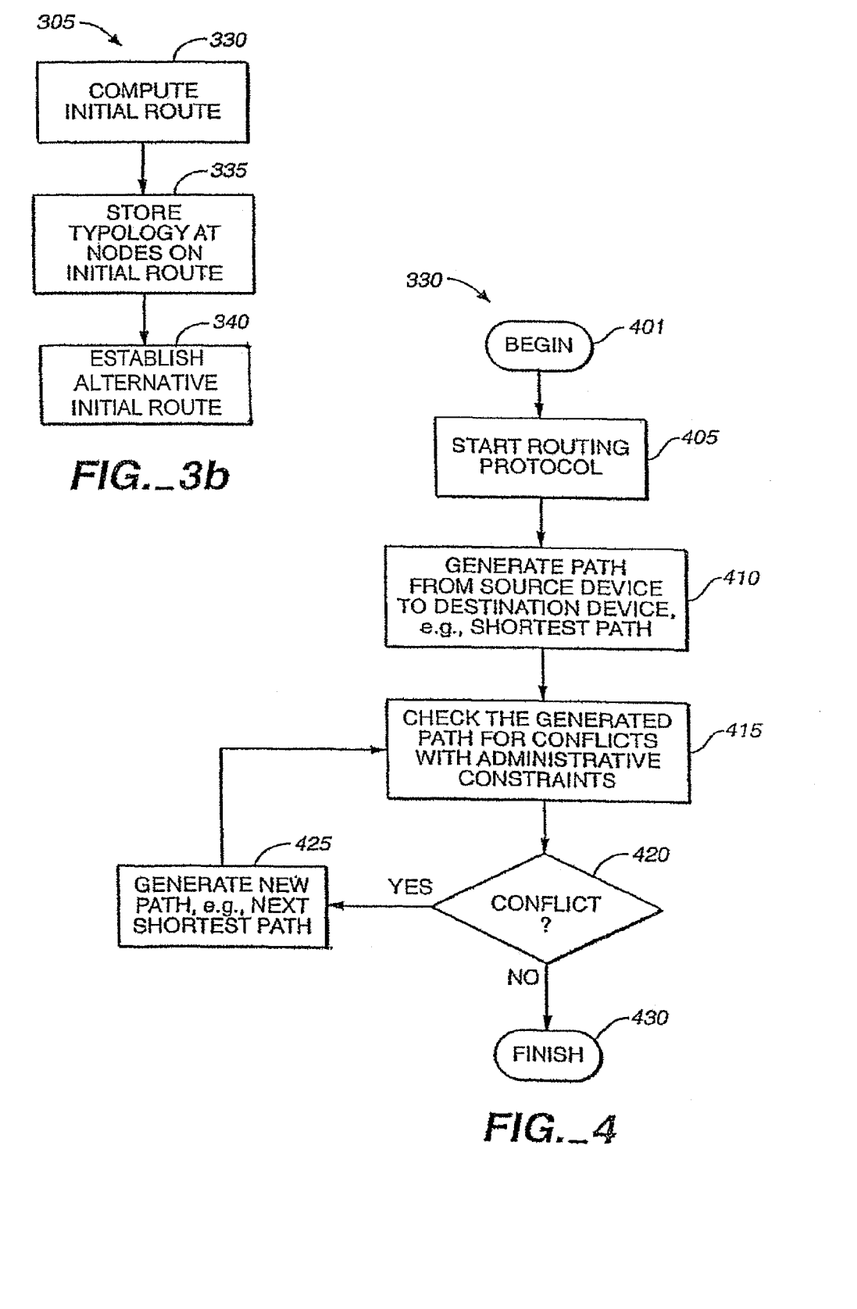

FIG. 4 is a flow diagram that describes details of calculating an initial route in step 330 of FIG. 3b. The process begins at step 401 as a routing protocol, such as IGP, is selected/started for calculating the shortest route from the source device 100 to destination device 110 (405). For example, a specialized Traffic Engineering Database can be used to calculate initial routes across the physical topology of the network according to a shortest route algorithm in step 410. However, shortest routes do not take into consideration such factors as link capacity and traffic pattern, and may sometimes cause congestion. Therefore, the route generated under step 410 can be further refined, as shown in step 415, according to administrative constraints. The most important administrative constraints include bandwidth and hop limits. A bandwidth constraint allows the user to specify the amount of bandwidth required for a particular route; hop limit constraints allow the user to specify a number of nodes that can be present in the final route. In one implementation, the hop limit is 255, by default. Other constraints include, for example, link "color" for inclusion or exclusion of certain links in the final route. Links between nodes are color-coded for classification purposes. If the generated route conflicts with administrative constraints (420), a new path is generated in step 425. This process continues until a route, e.g., a shortest route, without a conflict with administrative constraints, is generated and the process ends at step 430.

In one implementation, initial routes may optionally have a priority attribute attached. Initial routes with higher priority may preempt the traffic of other routes competing for the same network resources. Preemption allows a network to remove existing, established, low priority traffic for the purpose of accommodating higher priority traffic, thereby introducing a concept of "traffic class." In times of congestion, higher class traffic may get preferential treatment.

Figure 5A:
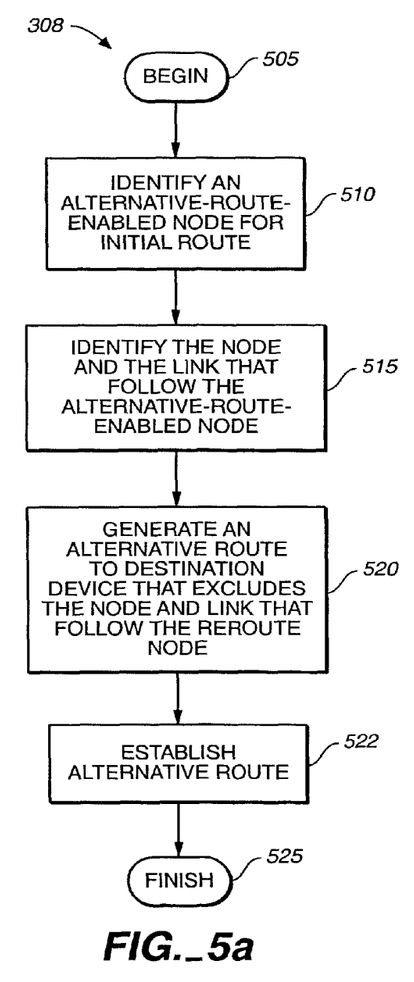
FIG. 5a is a flow diagram detailing the steps for generating an alternative route.

FIG. 5a details the steps of computing an alternative route. The process (step 308 of FIG. 3a) begins at step 505. One or more alternative-route-enabled nodes are identified (510). Reroute capability carries an overhead burden on the overall efficiency of the system and therefore not all nodes in network 140 are required to be alternative-route-enabled. Downstream node and links are then identified (515). In one implementation, it is assumed that the most immediate downstream node and link from the alternative-route-enabled node are the failed elements and therefore need to be avoided in calculating an alternative route in step 520. The system generates an alternative route using a routing protocol (520), establishes the route using signaling protocol RSVP (522), and the process ends in step 525.

In one implementation, the generated alternative routes are not screened for conflicts with administrative constraints so as to speed the processing and minimize overhead burden. In such an alternative route, a link failure results in rerouting of traffic that the upstream node was sending down the failed link. This capacity of traffic is known to the upstream node, so the upstream node can send a request to an immediately downstream node in the alternative route to reserve the necessary bandwidth.

Unlike bandwidth reservation for an initial route, which is granted or denied, bandwidth request for an alternative route can be double-booked. If the request is for an initial route, the system identifies the expected failed node and link. With this information, it is possible to compute independently the minimum bandwidth required. If it is for an alternative route, the network administrator will first examine to see if the requests are for different failed nodes. If so, and if the system can accommodate each request separately, the system grants both requests using double accounting to maximize bandwidth usage. If the requests are for the same failed node, the system will compute the sum of the different requests to see if it can accommodate the combined sum.

Figure 5B:
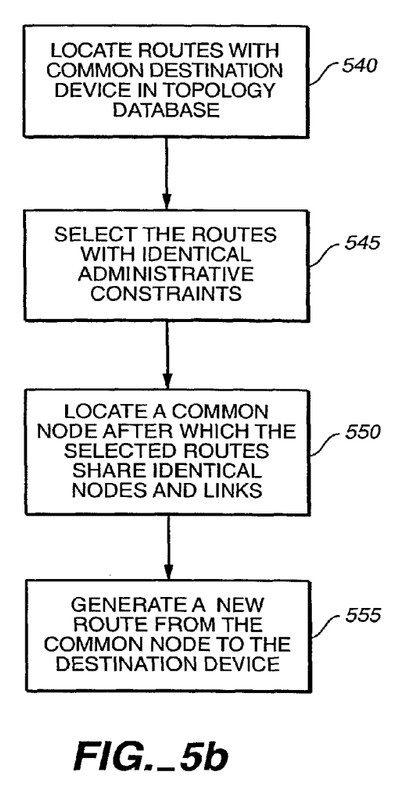
FIG. 5b is a flow diagram showing how routes can be merged for state optimization.

For better system efficiency, routes with identical destination device and topology can be merged, as outlined in FIG. 5b. Topology information is examined to locate routes with a common destination device (540). In step 545, the system checks to be sure that these routes share identical administrative constraints. In step 550, a common node after which the routes share nodes and links is located. The routes with this common node are merged and given a new route name by the system in step 555.

Figure 5C:
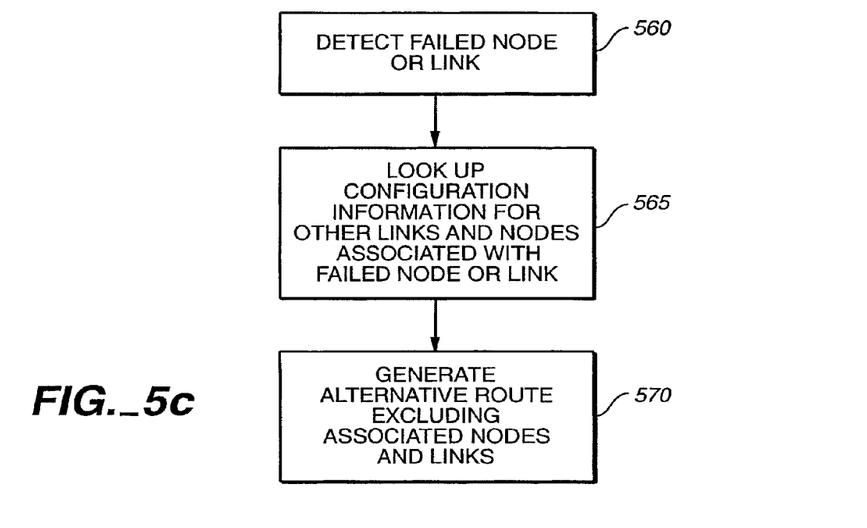
FIG. 5c is a flow diagram showing the steps for generating an alternative route excluding multiple network elements associated with a failed network element.

FIG. 5c describes another feature of the invention for dealing with multiple failed elements. For example, certain links and nodes in a network are likely to fail together; such data can be stored in the system configuration information. Therefore, upon detecting a failed element in step 560, the system configuration information is examined to identify other links and nodes which are potential simultaneous failure candidates in step 565. After they are identified, an alternative route excluding all identified elements and the failed element is generated in step 570.

Figure 6A:
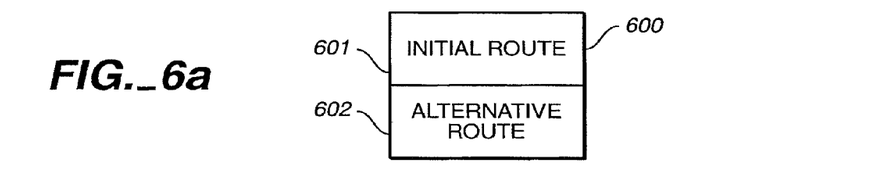
FIG. 6a shows a memory element for storing route information at alternative-route-enabled nodes.
Figure 6B:
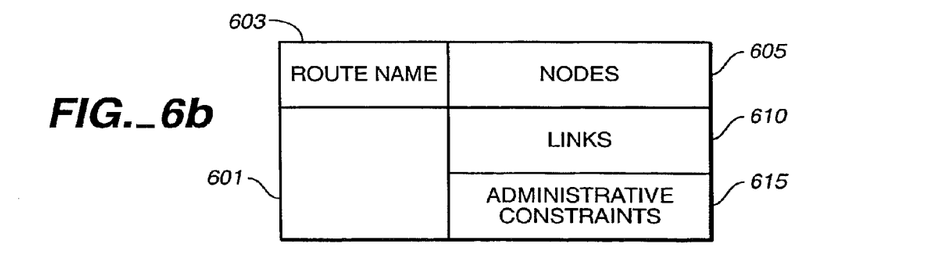
FIG. 6b shows the data structure for an initial route.
Figure 6C:
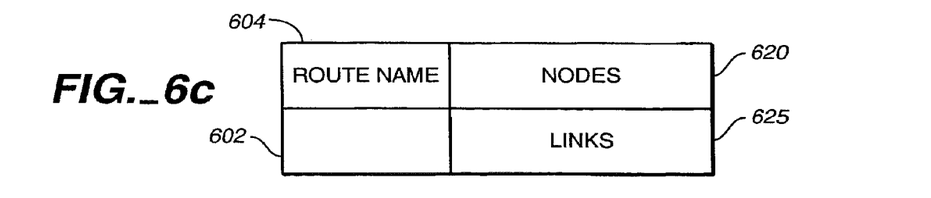
FIG. 6c illustrates the data structure for an alternative route.

FIG. 6a is a graphical representation of route information 600 stored in the storage space within a node. All alternative-route-enabled nodes store the topology of an initial route 601, and an alternative route 602 to be used in case the initial route fails. FIG. 6b shows a data structure associated with an initial route 601. The data structure includes route name 603, nodes 605, links 610, and administrative constraints 615 associated with the route. FIG. 6c shows the details of an alternative route 602. Alternative route 602 includes a route name 604, and its associated nodes 620 and links 625.

The present invention has been described in terms of specific implementations, which are illustrative of the invention and not to be construed as limiting. Other implementations are within the scope of the following claims.

What is claimed is:

1. A method comprising:
 forwarding, by a first node, first packets according to a first route, of a plurality of different routes, to a second node that is downstream, along the first route, of the first node;
 determining, by the first node and based on a failure of the second node, that the first node stores information regarding the plurality of different routes; and
 forwarding, by the first node and based on determining that the first node stores information regarding the plurality of different routes, second packets according to a second route, of the plurality of different routes,
  the second route not including the second node,
  the second route being created by merging a third route with a fourth route,
   the third route and the fourth route having a common node after which the third route and the fourth route share at least one node and at least one link,
  the second route being different from the first route, and
  the first packets and the second packets being associated with a same flow of packets.

2. The method of claim 1, further comprising:
 receiving the first packets; and
 adding a respective header to each of the first packets,
 where, when forwarding the first packets according to the first route, the method includes:
  forwarding the first packets, with the respective added headers, according to the first route.

3. The method of claim 1, further comprising:
 receiving the first packets; and
 replacing a respective header for each of the first packets,
 where, when forwarding the first packets according to the first route, the method includes:
  forwarding the first packets, with the respective replaced headers, according to the first route.

4. The method of claim 1, further comprising:
 identifying, based on the failure of the second node, a failure of one or more other nodes.

5. The method of claim 4, further comprising:
 determining that at least one of the one or more other nodes are associated with the failure; and
 excluding the at least one of the one or more other nodes from the second route.

6. The method of claim 1, further comprising:
 determining, by the first node, the second route.

7. The method of claim 1, further comprising:
 forwarding, along the second route, a request to reserve bandwidth.

8. A non-transitory computer-readable medium storing instructions, the instructions comprising:
 one or more instructions, which, when executed by a processor, cause the processor to:
  forward, from a first node, first packets according to a first route, of a plurality of different routes, to a second node that is downstream, along the first route, of the
first node;
determine, based on a failure of the second node, that the
first node stores information regarding the plurality of
different routes; and
forward, from the first node and based on determining
that the first node stores information regarding the
plurality of different routes, second packets according
to a second route, of the plurality of different routes,
the second route not including the second node,
the second route being created by merging a third
route with a fourth route,
the third route and the fourth route having a common node after which the third route and the
fourth route share at least one node and at least
one link,
the second route being different from the first route,
and
the first packets and the second packets being associated with a same flow of packets.

9. The non-transitory computer-readable medium of claim 8, where the instructions further comprise:
one or more instructions to receive the first packets; and
one or more instructions to add a respective header to each of the first packets,
where the one or more instructions to forward the first packets according to the first route include:
one or more instructions to forward the first packets, with the respective added headers, according to the first route.

10. The non-transitory computer-readable medium of claim 8, where the instructions further comprise:
one or more instructions to receive the first packets; and
one or more instructions to replace a respective header for each of the first packets,
where the one or more instructions to forward the first packets according to the first route include:
one or more instructions to forward the first packets, with the respective replaced headers, according to the first route.

11. The non-transitory computer-readable medium of claim 8, where the instructions further comprise:
one or more instructions to identify, based on the failure of the second node, a failure of one or more other nodes.

12. The non-transitory computer-readable medium of claim 11, where the instructions further comprise:
one or more instructions to determine that at least one of the one or more other nodes are associated with the failure; and
one or more instructions to exclude the at least one of the one or more other nodes from the second route.

13. The non-transitory computer-readable medium of claim 8, where the instructions further comprise:
one or more instructions to forward, along the second route, a request to reserve bandwidth.

14. A network node comprising:
a processor to:
forward first packets according to a first route, of a plurality of different routes, to a second node that is downstream, along the first route, of the first node;
determine, based on a failure of the second node, that the first node stores information regarding the plurality of different routes; and
forward, based on determining that the first node stores information regarding the plurality of different routes, second packets according to a second route, of the plurality of different routes,
the second route not including the second node,
the second route being created by merging a third route with a fourth route,
the third route and the fourth route having a common node after which the third route and the fourth route share at least one node and at least one link,
the second route being different from the first route, and
the first packets and the second packets being associated with a same flow of packets.

15. The network node of claim 14, where the processor is further to:
receive the first packets; and
add a respective header to each of the first packets,
where, when forwarding the first packets according to the first route, the processor is further to:
forward the first packets, with the respective added headers, according to the first route.

16. The network node of claim 14, where the processor is further to:
receive the first packets; and
replace a respective header for each of the first packets,
where, when forwarding the first packets according to the first route, the processor is further to:
forward the first packets, with the respective replaced headers, according to the first route.

17. The network node of claim 14, where the processor is further to:
identify, based on the failure of the second node, a failure of one or more other nodes.

18. The network node of claim 17, where the processor is further to:
determine that at least one of the one or more other nodes are associated with the failure; and
exclude the at least one of the one or more other nodes from the second route.

19. The network node of claim 14, where the processor is further to:
determine the second route.

20. The network node of claim 14, where the processor is further to:
forward, along the second route, a request to reserve bandwidth.

* * * * *